United States Patent Office 2,716,082
Patented Aug. 23, 1955

2,716,082
FLUORESCENT SCREENS

James S. Smith, Towanda, Pa., assignor to E. I. du Pont de Nemours and Company, Wilmington, Del., a corporation of Delaware No Drawing. Application November 19, 1951, Serial No. 257,200

9 Claims. (Cl. 154—95)

This invention relates to fluorescent screens. More particularly, it relates to fluorescent screens which have a matte surface and utilize a mixture of cellulose nitrate and an alkyl methacrylate polymer as the binding agent for the fluorescent particles.

An object of this invention is to provide fluorescent screens. A further object is to provide such screens which have a dull or matte surface. Another object is to provide a simple and practical process for making such matte screens. Yet another object is to prepare such matte screens from readily available and economical materials. Still other objects will be apparent from the following description of the invention.

The fluorescent screens of this invention are made by suspending discrete particles of a fluorescent material in a solution of a mixture of cellulose nitrate and an alkyl methacrylate polymer wherein the alkyl group contains from 1 to 4 carbon atoms, coating the resulting solution onto a thin cellulose acetate film disposed on a casting surface, applying a suitable backing sheet and stripping the assembly from the casting surface.

In carrying out the invention, a solution of cellulose acetate, cellulose acetate propionate or cellulose acetate butyrate or other cellulose ester containing a high percentage of acetate groups, in a volatile solvent is cast onto a smooth surface, e. g., a glass plate to form a thin layer having a thickness of 0.002 to 0.05 millimeter, a suspension of fluorescent particles in a solution comprising a mixture of cellulose nitrate, an alkyl methacrylate polymer and a high-boiling cellulose acetate solvent is coated onto the thin layer of the hydrophobic cellulose acetate, a backing sheet of paper, cardboard, cellulose derivative, synthetic resin or super polymer is applied to the freshly cast surface of the fluorescent layer or onto an adhesive layer on such layer and the entire assembly including the cellulose acetate layer is removed from the casting surface.

It has been discovered that after the assembly has been removed from the casting surface and allowed to stand for a short period the screen has a delustered or matte appearance. This result is, of course, very desirable but could not have been predicted from the nature of the compositions employed since other resins, e. g., polyvinylchloride-acetate do not give similar results although it has the same degree of incompatability as polymethylmethacrylate with cellulose acetate.

The proportions of cellulose nitrate and alkyl methacrylate polymer used in the fluorescent composition may vary over a fairly wide range, e. g., from 0.4 to 8 parts of cellulose nitrate per part by weight of alkyl methacrylate polymer.

The ratio of the mixture of binding agents to the fluorescent particles may likewise vary over a fairly wide range, e. g., 1 part by weight of the former to 4 to 50 parts by weight of the latter depending upon the particular fluorescent compound or mixture of compounds used. In general, the smaller the amount of binder the better the fluorescent screen.

The invention will be further illustrated but is not intended to be limited by the following examples wherein the parts stated are parts by weight.

Example I

The following ingredients were placed in a ball mill:

| | Parts |
|---|---|
| Calcium wolframate (fluorescent) | 300.0 |
| Methyl ether of ethylene glycol acetate | 54.0 |
| Butyl phthalyl butyl glycollate | 16.5 |
| n-Butyl acetate | 126.0 |
| Cellulose nitrate (150″ viscosity) | 10.0 |
| Polymethyl methacrylate | 6.5 |

After milling for a period of 4 to 6 hours the resulting suspension is cast through an elongated narrow orifice of about 0.7 mm. onto a thin layer of cellulose acetate which was deposited onto a polished glass plate. The latter layer was cast from a 5 to 10% solution in dioxane to a thickness of about 0.4 mm. After the calcium wolframate coating has set up, a cardboard sheet is applied to outer surface. A solution of cellulose nitrate in ester or ketone solvents, e. g., methyl acetate, ethyl acetate, acetone, etc., is applied to the outer surface of the cardboard sheet. After drying at room temperature for a period of 10 to 20 hours, the entire assembly is stripped from the glass plate. The surface of the fluorescent screen becomes matte after standing, with free exposure to the atmosphere, for a period of 1 hour.

Example II

The following ingredients are placed in a mortar:

| | Parts |
|---|---|
| Barium lead sulfate (fluorescent mixed crystals) | 100.0 |
| n-Butyl acetate | 42.0 |
| Methyl ether of ethylene glycol acetate | 18.0 |
| Butyl phthalyl butyl glycollate | 5.5 |
| Cellulose nitrate (150″ viscosity) | 3.3 |
| Polyethyl methacrylate | 2.2 |

After thoroughly mixing the ingredients with a pestle, the suspension is cast through an elongated narrow orifice having a width of about 0.8 mm. onto a thin cellulose acetate film which is coated on a glass plate. The cellulose acetate layer is cast from a 5 to 10% solution in dioxane to a thickness of about 0.4 mm. When the barium lead sulfate coating is set up properly, a cardboard sheet is applied to its outer surface. A waterproofing coat is then applied to the outer surface of the cardboard sheet after the manner described in Example I. After drying for a period of 12 to 20 hours at room temperature, the entire assembly is stripped from the glass plate. The surface of the fluorescent screen becomes matte after standing with free exposure to the atmosphere for a period of 1 hour.

Example III

In Example II in place of the cardboard sheet and waterproofing layer the following mixture may be applied to the barium lead sulfate coating to form a layer 1.4 mm. thick:

| | Parts |
|---|---|
| Titania | 2.0 |
| Butyl phthalyl butyl glycollate | 5.0 |
| Methyl ether of ethylene glycol acetate | 17.3 |
| n-Butyl acetate | 87.6 |
| Cellulose nitrate | 11.1 |
| Polyvinyl acetate | 8.9 |

After baking at 65° C. for 10 to 20 hours, the entire assembly is stripped from the glass plate. The surface of the fluorescent screen becomes matte after standing with free exposure to the atmosphere for a period of 1 hour.

In place of the particular fluorescent materials described in the foregoing examples, there may be substituted equivalent amounts of various other fluorescent compounds or mixtures of compounds, e. g., zinc sulfide, zinc cadmium sulfide mixed crystals, magnesium wolframate and zinc silicate. Dispersing agents can be used if desired with the fluorescent materials in making the dispersions.

Similarly, in place of the particular polyalkyl methacrylate given in the above examples one may substitute other alkyl methacrylate polymers including isopropyl methacrylate polymers, n-propyl methacrylate polymers, isobutyl methacrylate polymers, copolymers of two or more of such alkyl methacrylates or of such alkyl methacrylates with acrylic acid esters, e. g., methyl acrylate, ethyl acrylate including butyl methacrylateisobutyl methacrylate copolymer, methyl methacrylatemethyl acrylate copolymer. The copolymers preferably contain more than 50% by weight of the alkyl methacrylate component.

In place of the particular high-boiling solvent given in the foregoing examples there may be substituted various other high-boiling solvents boiling above 120° C. or higher, which have a solvent action on cellulose acetate or mixed cellulose esters containing a high percentage of acetate groups. Suitable solvents include methyl lactate, ethyl lactate, diacetone alcohol, acetonyl acetone and mixtures of two or more of such solvents. In addition, solvents boiling below 120° C., e. g., acetone, butanone, pentanone, ethyl acetate, propyl acetate, amyl acetate, dioxolane, methyl dioxolane, and the propanols and butanols can be used in admixture with the high-boiling solvent.

In place of the cardboard support described in the foregoing examples, there may be substituted other flexible or stiff supports. Suitable additional supports include plastics, e. g., cellulose derivatives including cellulose acetate, cellulose acetate propionate, cellulose acetate butyrate, ethyl cellulose, cellulose nitrate; super polymers, e. g., polyvinyl chloride, polyamides, e. g., nylon and polyesters, e. g., polyethylene terephthalate; aluminum and aluminum alloys. These supports should, of course, be permeable to X-rays.

The supports when composed of plastic materials may contain various pigments or dyes in order to make them more or less opaque to light. Suitable materials include $TiO_2$, $ZrO_2$, ZnO, ZnS, Fast Acid Magenta B, Colour Index 30; Azo Cardinal G, Colour Index 42; Alizarine Yellow 4G, Colour Index 52; Naphthol Orange, Color Index 150; Diamond Yellow R, Colour Index 213; Pontacyl Cloth Red 3G, Colour Index 256; Janus Red B, Colour Index 266; Diamine Yellow N, Colour Index 488 and Milling Scarlet 3B, Colour Index 487.

Clear coatings can be applied as backing coats for the fluorescent screens and serve as an adhesive layer to a card or plastic sheet support. These layers may contain pigments as just described to reduce or increase reflection of fluorescent light. A solution of polyvinyl acetate, for example, provides a suitable adhesive layer. Magnesium oxide-pigmented-cellulose nitrate or -ethyl cellulose solutions form useful pigmented layers.

An advantage of the invention is that it provides a simple and economical method of producing fluorescent screens which have a matte surface. The invention has the further advantage that at all times during the fabrication of the screens only the back is exposed to air-borne dust and other particles.

As many widely different embodiments of this invention can be made without departing from the spirit and scope thereof, it is to be understood that the invention is not to be limited except as defined by the claims.

What is claimed is:

1. A fluorescent screen comprising a sheet support bearing on one surface in order a layer comprising discrete particles of fluorescent material dispersed in a hard-film-forming binding agent comprising a mixture of cellulose nitrate and an alkyl methacrylate polymer said alkyl group containing 1 to 4 carbon atoms, the cellulose nitrate being present in the proportion of 0.4 to 8.0 parts per part by weight of said polymer and an adherent protective layer having a thickness of 0.002 to 0.05 millimeter composed of a hydrophobic cellulose carboxylic acid ester predominating in acetate groups taken from the group consisting of cellulose acetate, cellulose acetate propionate and cellulose acetate butyrate.

2. A fluorescent screen comprising a sheet support bearing on one surface in order a layer comprising discete particles of fluorescent material dispersed in a hard-film-forming binding agent comprising a mixture of cellulose nitrate and an alkyl methacrylate polymer said alkyl group containing 1 to 4 carbon atoms, the cellulose nitrate being present in the proportion of 0.4 to 8.0 parts per part by weight of said polymer, the dispersion being in a ratio of 1 part by weight of the binding agent to 4 to 50 parts of the fluorescent material and an adherent protective layer having a thickness of 0.002 to 0.05 millimeter composed of a hydrophobic cellulose acetate.

3. A fluorescent screen comprising a flexible cardboard sheet bearing on one surface thereof in order a layer comprising discrete particles of fluorescent material dispersed in a binding agent composed of a mixture of cellulose nitrate and a methyl methacrylate polymer, the cellulose nitrate being present in the proportion of 0.4 to 8.0 parts per part by weight of said polymer, the dispersion being in a ratio of 1 part by weight of the binding agent to 4 to 50 parts of the fluorescent material and an adherent layer of cellulose acetate having a thickness of 0.002 to 0.05 millimeter.

4. The process which comprises coating a thin layer of a cellulose carboxylic acid ester predominating in acetate groups taken from the group consisting of cellulose acetate, cellulose acetate propionate and cellulose acetate butyrate onto a smooth casting surface, coating a dispersion comprising (a) discrete particles of a fluoresent material in a mixture comprising cellulose nitrate and an alkyl methacrylate polymer said alkyl group containing 1 to 4 carbon atoms, the cellulose nitrate being present in the proportion of 0.4 to 8.0 parts per part by weight of said polymer, the dispersion being in a ratio of 1 part by weight of the binding agent to 4 to 50 parts of the fluorescent material and (b) a high-boiling cellulose acetate solvent onto the cellulose ester layer, applying a backing sheet to the layer of fluorescent particles and stripping the screen assembly from the casting surface.

5. A fluorescent screen comprising a sheet support having in order on one surface, an adhesive layer containing a pigment, a layer comprising discrete particles of fluorescent material dispersed in a hard-film-forming binding agent comprising a mixture of cellulose nitrate and an alkyl methacrylate polymer, said alkyl group containing 1 to 4 carbon atoms, the cellulose nitrate being present in the proportion of 0.4 to 8.0 parts per part by weight of said polymer, the dispersion being in a ratio of 1 part by weight of the binding agent to 4 to 50 parts of the fluorescent material and a protective layer having a thickness of 0.002 to 0.05 millimeter composed of a hydrophobic cellulose acetate.

6. A screen as set forth in claim 3 wherein said material is calcium wolframate.

7. A screen as set forth in claim 3 wherein the other surface of the sheet is coated with cellulose nitrate.

8. A screen as set forth in claim 3 wherein said material is barium-lead sulfate mixed crystals.

9. A process as set forth in claim 4 wherein said cellulose ester is cellulose acetate, said material is calcium wolframate and said solvent is the methyl ether of ethylene glycol acetate.

References Cited in the file of this patent

UNITED STATES PATENTS

| | | |
|---|---|---|
| 1,824,690 | Schneider | Sept. 22, 1931 |
| 2,076,984 | Eggert et al. | Apr. 13, 1937 |
| 2,089,413 | Paine et al. | Aug. 10, 1937 |
| 2,119,702 | Carroll | June 7, 1938 |
| 2,375,177 | Reese | May 1, 1945 |
| 2,417,383 | Switzer | Mar. 11, 1947 |
| 2,520,113 | Brown et al. | Aug. 29, 1950 |
| 2,554,150 | Moore | May 22, 1951 |